(12) United States Patent
Gaither

(10) Patent No.: US 7,833,071 B2
(45) Date of Patent: Nov. 16, 2010

(54) AMPHIBIOUS ALL-TERRAIN VEHICLE

(75) Inventor: R. Louis Gaither, Covington, TN (US)

(73) Assignee: Hydratrek, LLC, Covington, TN (US)

( * ) Notice: Subject to any disclaimer, the term of this patent is extended or adjusted under 35 U.S.C. 154(b) by 0 days.

(21) Appl. No.: 11/760,197

(22) Filed: Jun. 8, 2007

(65) Prior Publication Data
US 2008/0227344 A1 Sep. 18, 2008

Related U.S. Application Data

(60) Provisional application No. 60/812,530, filed on Jun. 9, 2006.

(51) Int. Cl.
*B60F 3/00* (2006.01)
*B63H 19/08* (2006.01)
*B63H 21/12* (2006.01)
*B63H 21/165* (2006.01)

(52) U.S. Cl. .................. 440/12.5; 440/5; 440/12.51; 440/12.57

(58) Field of Classification Search ............... 440/12.5, 440/12.51, 12.57, 5
See application file for complete search history.

(56) References Cited

U.S. PATENT DOCUMENTS

| | | | |
|---|---|---|---|
| 3,199,486 A | 8/1965 | Gillois et al. | |
| 3,385,255 A | 5/1968 | Raymond et al. | |
| 3,444,837 A | 5/1969 | Donofrio | |
| 3,664,451 A | 5/1972 | Rogers et al. | |
| 4,664,051 A | 5/1987 | Newkirk | |
| 4,671,774 A | 6/1987 | Owsen | |
| 4,744,324 A | 5/1988 | Martinmaas | |
| 5,476,400 A | 12/1995 | Theophanides | |
| 5,546,751 A | 8/1996 | Last | |
| 5,993,273 A * | 11/1999 | Adams | 440/5 |
| 6,626,712 B1 * | 9/2003 | Bellezza Quater et al. | 440/12.56 |
| 6,666,735 B2 | 12/2003 | Benoit | |
| 6,672,916 B1 | 1/2004 | Lent-Phillips et al. | |
| 2006/0237239 A1 | 10/2006 | Bruner et al. | |

* cited by examiner

*Primary Examiner*—Daniel V Venne
(74) *Attorney, Agent, or Firm*—Wyatt, Tarrant & Combs, LLP; H. Roy Berkenstock; Matthew A. Williams

(57) ABSTRACT

An amphibious, all-terrain vehicle utilizing a pair of hydrostatic pumps to independently provide power to hydraulic drive mechanisms of the left and right side of the vehicle respectively. The hydraulic drive mechanisms on a side of the vehicle comprise a plurality of hydraulic wheel motors and a hydraulic propeller motor. Using a novel hydraulic manifold assembly, the vehicle can operate in three distinct modes: wheels only, wheels and propellers, and propellers only. The hydraulic manifold assembly also allow the vehicle to by put in neutral mode for starting. The wheel motors are mounted in a pair of undercarriage assemblies that are outside of the vehicle's body and fluidly connected to the hydraulic manifold assembly thorough a hose chase that extends well above the vehicle's waterline to eliminate the potential for water to enter the body of the vehicle when operated in the water.

13 Claims, 15 Drawing Sheets

FORWARD

GRADUAL RIGHT TURN

SHARP RIGHT TURN

REVERSE

Wheels Only

Wheels & Propellers

Propeller Only

Neutral

AMPHIBIOUS ALL-TERRAIN VEHICLE

CROSS-REFERENCE TO RELATED APPLICATIONS

This application claims the benefit of U.S. Provisional Application No. 60/812,530, filed Jun. 9, 2006.

STATEMENT REGARDING FEDERALLY SPONSORED RESEARCH OR DEVELOPMENT

Not applicable

REFERENCE TO MICROFICHE APPENDIX

Not applicable

BACKGROUND OF THE INVENTION

1. Field of the Invention

The present invention generally relates to amphibious motor vehicles. More specifically, the invention is an amphibious vehicle that utilizes four, six, or eight independent, hydraulically driven wheels when the wheels are in contact with the ground and a pair of propellers when the vehicle is in water. Further, a single pair of levers controls the speed and direction of the vehicle both on land and in water.

2. Description of the Related Art

A variety of amphibious all-terrain vehicles have been devised in an attempt to allow the user to easily traverse from land to water operation and vice versa quickly and easily. The following patents, which are incorporated herein by reference, generally represent the state of the art.

U.S. Pat. No. 3,664,451 describes a vehicle having front and rear body sections rotatably interconnected along the longitudinal axis of the body sections. An engine is located in the front body section and a drive shaft extends through the coupling between the body sections through the compartment of the rear body section and to a gear box on a rear axle located entirely outside of the compartment of the rear body section. Frame members extend from the rear body section to support the rear axle. A propeller may be connected to a drive shaft extending rearwardly from the gear box on the rear axle.

U.S. Pat. No. 4,744,324 describes an all-terrain vehicle that is adapted to amphibious operation by means of a conversion kit that uses rear axle extensions to mount outer rear wheels and radial paddle elements between the inner and outer rear wheels. Flotation is provided by over-size tires.

U.S. Pat. No. 6,672,916 describes an amphibious vehicle having an open seating arrangement and which comprises a drive motor for reciprocally or simultaneously driving an all-wheel drive traveling mechanism and a swimming drive that is configured as a jet drive by means of at least two clutches that operate independently of one another, whereby the drive motor is arranged underneath the seating arrangement in an essentially central manner between the axles of the traveling mechanism.

U.S. Pat. No. 3,444,837 discloses a utility vehicle having structural features directed to a self supporting powered chassis comprising a clutch mechanism that functions by the principal use of planetary gear systems. In addition, the wheels are driven by a series chains and sprockets.

U.S. Pat. No. 3,199,486 describes an amphibious vehicle having a body adapted to be armored and having power driven front and rear axles connected with front and rear wheels for travel on land, propeller means for travel on water; and drive means for said front and rear wheels and for said propeller means, said wheels being equipped with oversized, shot-proof low pressure tires, the tires for said power driven front wheels projecting ahead of said body, and said drive means including transmission means selectively operative to drive said front and said rear wheels together, said wheels and said propeller means simultaneously, and said propeller means separately, and said transmission means including a propeller driving transmission portion and a land driving transmission portion operative at a land traveling speed not exceeding the speed of water travel, said propeller driving transmission portion including a horizontal drive shaft and said propeller means including a propeller drive shaft extending perpendicularly to said horizontal drive shaft and being connected thereto and pivotally movable about its own axis and about the axis of said horizontal drive shaft.

U.S. Pat. No. 5,993,273 describes an amphibious all-terrain vehicle having a substantially rectangular body or shell constructed of a lightweight durable metallic material. A combustion gas engine is coupled to a dual hydraulic pump system. Six-independent wheel motors are symmetrically disposed in series, three on each side of the shell and are plumbed in series for ground-based mobility respectively. Each of the wheel motors penetrates the shell beneath the waterline of the vehicle. An auxiliary hydraulic pump may be provided to drive a hydraulic propeller motor, said motor also penetrating the shell beneath the waterline. Separate controls are used to control the wheels and the propeller.

U.S. Pat. No. 6,666,735 discloses an amphibious off-road vehicle drive that utilizes an internal combustion engine drive system and a liquid propulsion jet drive system jointly functional in a single engine case of the off-road vehicle for enabling forward motion of the vehicle. The jet drive system provides a means for engaging and disengaging with the internal combustion engine drive system. An outrigger flotation device engages with the off-road vehicle and is adapted for adjustment between a stored attitude and a deployed attitude. When the vehicle enters deep water, the jet drive may be employed to propel the vehicle, and the flotation gear may be employed to maintain buoyancy.

U.S. Pat. No. 4,664,051 discloses a flotation kit to be used to adapt a conventional three wheel all-terrain vehicle for amphibious use.

U.S. Pat. No. 3,385,255 discloses a track type amphibious vehicle with three drive wheels for carrying an endless track mounted on each side of the vehicle. The drive wheels on each side are mounted on axles that protrude from a sealed box beam mounted underneath the vehicle, and below the vehicle's waterline, and are driven by a single hydraulic motor that delivers power to each wheel through a chain and sprocket system. The chain drive is lubricated by a reservoir of lubricating fluid contained in said box beam. Propulsion in the water is provided by a pair of auxiliary motors that are releasably mounted on the rear end wall of the vehicle and that drive a pair or propellers. When the vehicle is in the water, both the propellers and the wheels are driven simultaneously.

The complexity of designing a vehicle that can operate effectively on all terrain and easily traverse from land operation to water operation and back has lead to a variety of problems that plague known devices. One problem in known devices is that the drive mechanism, or mechanisms, for the wheels passes through the shell of the vehicle beneath the waterline. Thus, as the drive mechanism is stressed through torque applied by the power source and through vibration and impact as the vehicle traverses uneven ground, the seal around the mechanism, or mechanisms, tends to fail, allowing water into the passenger compartment.

A second problem is the use of drive systems that utilize a single motor to drive all of the wheels on a single side of the vehicle through complex, failure-prone mechanical systems such as the chain-and-sprocket drive system disclosed in U.S. Pat. No. 3,385,255.

A third problem is the fact that known vehicles that utilize a water propulsion system in addition to their drive wheels either require a separate set of controls for the ground and water propulsion mechanisms or, when a single set of controls is used, drive the wheels simultaneously with the water propulsion mechanism. The first situation is a problem because it makes it difficult for a single operator to drive the vehicle out of water effectively because this feat generally requires the operator to coordinate the drive systems such that water propulsion system provides sufficient forward force to allow the wheels to engage with the ground forming the bottom of the body of water without slipping. The second situation is a problem because it siphons power from the water propulsion system and because the rotation of the tires in the water creates drag.

A fourth problem is that the utilization of a single hydraulic system to drive wheel motors and a propeller motor can result subjecting the propeller motor to high pressure when the vehicle is operated in wheels only mode. This can result in a significant drop in performance of the vehicle because hydraulic motors suitable for providing the high RPM output necessary to drive a propeller are typically of the case drain design such as the PGM-330 from Parker Hannifin Corporation. If such a case drain type motor is subjected to high pressure and not allowed to rotate, a leakage through the case drain can occur resulting in a significant loss in performance.

A fifth problem is the complexity and cost of building a vehicle with independent hydraulic systems to control both land and water propulsion motors on the left and right sides of the vehicle that can be operated in three distinct modes—land drive only, land and water drive, and water drive only—using single set of controls.

SUMMARY OF THE INVENTION

The amphibious all-terrain vehicle of the present invention differs from the vehicles disclosed in the prior art by resolving the long existing problems associated with said prior art vehicles. The present invention utilizes four, six, or eight hydraulic wheel motors, preferably six, mounted in pairs on opposite sides of the vehicle. The wheel motors on a side of the vehicle are connected in series to create an all-wheel drive system that does not require the use of a complex, failure-prone, mechanical drive system. The vehicle also includes a pair of hydraulic water propulsion motors that are located toward the rear of the vehicle with one hydraulic water propulsion motor on each side of the vehicle's longitudinal centerline.

The wheel motors are mounted to an undercarriage such that they are completely outside of the tub that comprises the passenger compartment. The wheel motors are connected to the hydraulic system using hydraulic lines that pass through a pair of hose chases built into the tub that extend above the vehicles waterline so that water cannot enter the tub through the hose chases.

In addition, the present invention utilizes a single pair of levers to control the speed and direction of the vehicle regardless of whether the vehicle is on the land or in the water. When the vehicle is in the water, the hydraulic water propulsion motors can used by themselves or in combination with the hydraulic wheel motors.

The present invention additionally includes a pair of novel hydraulic manifold assemblies that allows the vehicle to be controlled by a single set of controls while being operated in three distinct modes: land drive only; land and water drives simultaneously; and water drive only. The hydraulic manifold assemblies utilize mechanically actuated ball valves to select the vehicle's operational mode and isolates the propeller motors from high pressure when the vehicle is operated in land drive only mode. Moreover, the operator controls the valves in the manifold assemblies using two levers connected by cables to a pair of yokes that actuate the valves on the manifold assemblies. This eliminates the need to use expensive, electrically actuated valves that tend to create problems in high pressure systems due to increased pressure drops and unexpected changes in state due to a Bernoulli effect.

BRIEF DESCRIPTION OF THE DRAWINGS

The accompanying drawings, which are incorporated in and constitute a part of this specification, illustrate embodiments of the invention and, together with a general description of the invention given above and the detailed description of the preferred embodiments given below, serve to explain the principles of the invention. It should however be understood that there is no intent to limit the invention to the particular forms disclosed, and that this patent application incorporates by reference all references and publications disclosed herein. Rather, the intent is that the invention be limited only by the scope of the claims.

DESCRIPTION OF THE PREFERRED EMBODIMENT(S)

Figure 1:
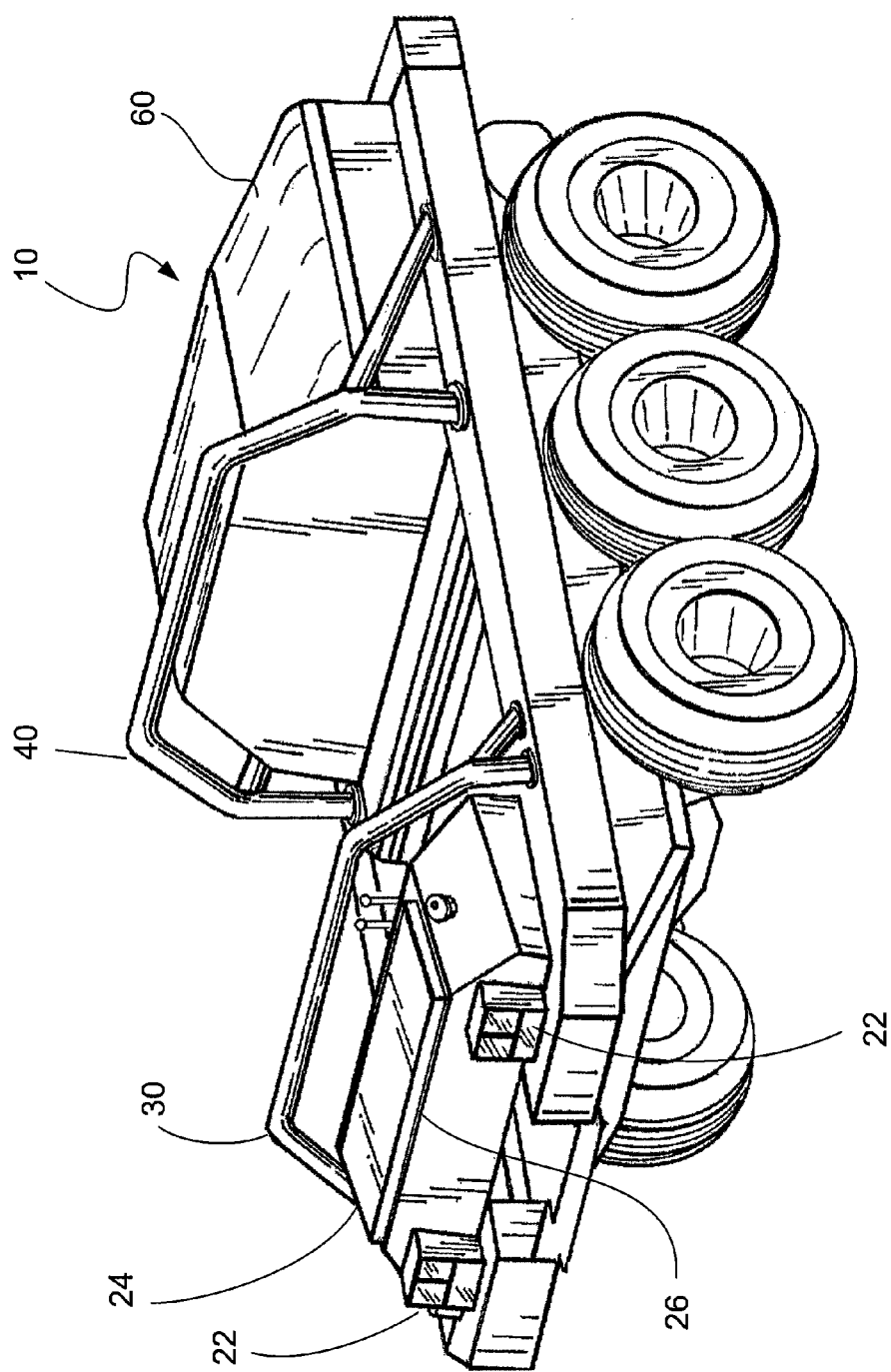
FIG. 1—Perspective view of the vehicle.
Figure 2:
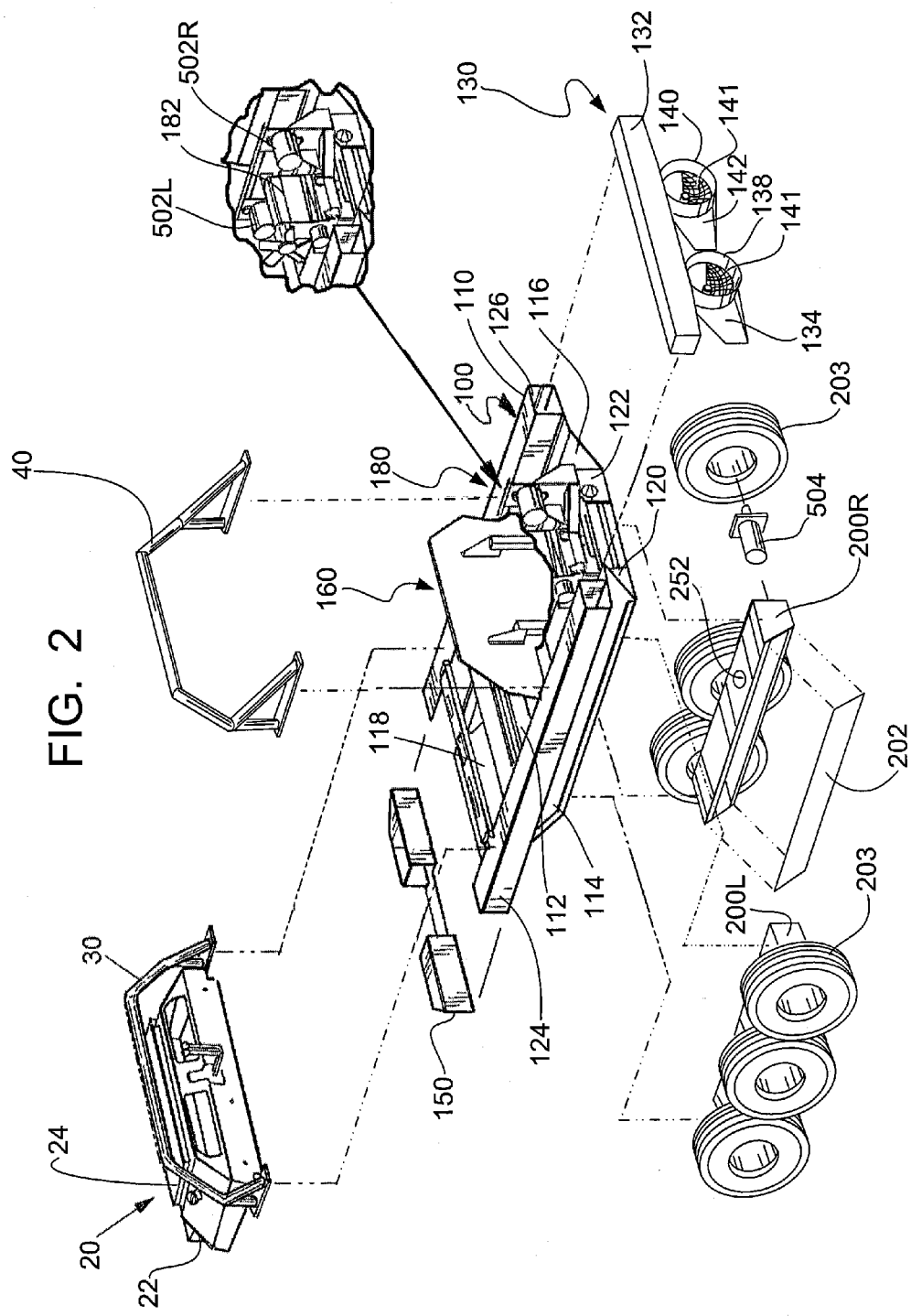
FIG. 2—Exploded perspective view.

FIG. 1 illustrates an embodiment of the amphibious all-terrain vehicle 10 according to the present invention. Referring now to FIG. 2, vehicle 10 includes body assembly 100, left undercarriage assembly 200*l*, right undercarriage assembly 200r, front hood assembly 20, grab bar 30, roll bar 40, and rear hood 60 (shown in FIG. 1).

Body Assembly

Still referring to FIG. 2, body assembly 100 includes body 110, rear bumper assembly 130, front bumper 150, passenger compartment 160, and mechanical compartment 180. Body 110 includes floor 112, left sidewall 114, right sidewall 116, frontwall 118, left propeller motor mounting flange 120, and right propeller motor mounting flange 122.

Left propeller motor mounting flange 120 extends upward from the left side of the end of floor 112. The left edge of left propeller mounting flange 120 is permanently attached to the inside surface of left side wall 116, preferably by welding. Right propeller motor mounting flange 122 extends upward from the right side of the end of floor 112. The right edge of right propeller mounting flange 122 is permanently attached to the inside surface of right side wall 116, preferably by welding.

Left side wall 114 and right side wall 116 extend upward from the left and right edge of floor 112 respectively. Left side wall 114 terminates in left pontoon 124; right side wall 116 terminates in right pontoon 126. Pontoons 124 and 126 are preferably filled with closed cell expanded bead polystyrene foam. The front end of side walls 114 and 116 taper down from the front ends of pontoons 124 and 126 respectively to the front edge of bottom 112. The rear ends of side walls of 114 and 116 taper down from the rear ends of pontoons 124 and 126 respectively to the rear end of bottom 112. Front wall 118 extends upward and away from floor 112 at an obtuse angle that is preferably between 140 and 160 degrees. Front bumper 150 is conjoined to the upper edge of front wall 118 and to the front ends of pontoons 124 and 126 to form a watertight seal, preferably by welding.

Figure 4:
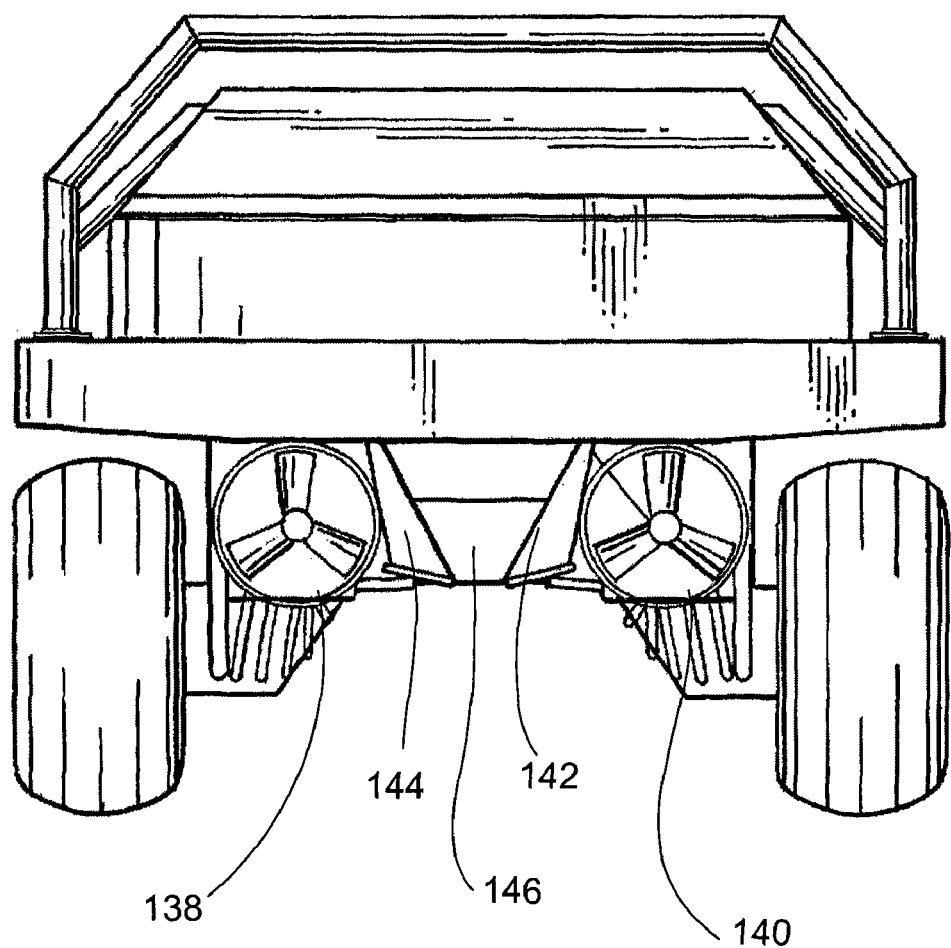
FIG. 4—Rear view of the vehicle.

Still referring to FIG. 2, rear bumper assembly 130 is comprised of a rear bumper 132, left bumper assembly mounting flange 134, right bumper assembly mounting flange 136 (not shown), left propeller shroud 138, right propeller shroud 140, propeller screens 141, central mounting flanges 142 and 144, and rear wall 146. Central mounting flange 144 and rear wall 146 are best seen in FIG. 4. (Propeller shrouds 138 and 140 and screens 141 surround the propellers and extend forward to body assembly 100 to protect the propellers from contact with foreign objects).

Again referring to FIG. 2, rear bumper assembly 130 is conjoined to body 110, preferably by welding, to form a watertight seal between rear bumper assembly 130 and body 110. More specifically, left bumper assembly mounting flange 134 is attached to the inside surface of the rear tapered portion of left side wall 114, right bumper assembly mounting flange 136 is attached to the inside surface of the rear tapered portion of right side wall 116, central mounting flanges 142 and 144 are connected to the inside edge of propeller motor mounting flanges 120 and 122 respectively, and the lower edge of rear wall 146 is connected to the edge of bottom 112 between propeller mounting flanges 120 and 122.

Mounted on top of body assembly 100 is front hood assembly 20, grab bar 30, roll bar 40, and rear hood 60. Front hood assembly 20 includes a pair of headlights 22, a fold down windshield 24, and a hinged hood 26. Rear hood 60 is removably attached to body assembly 100, preferably using flange bolts, and covers mechanical compartment 180.

Passenger Compartment

Figure 3:
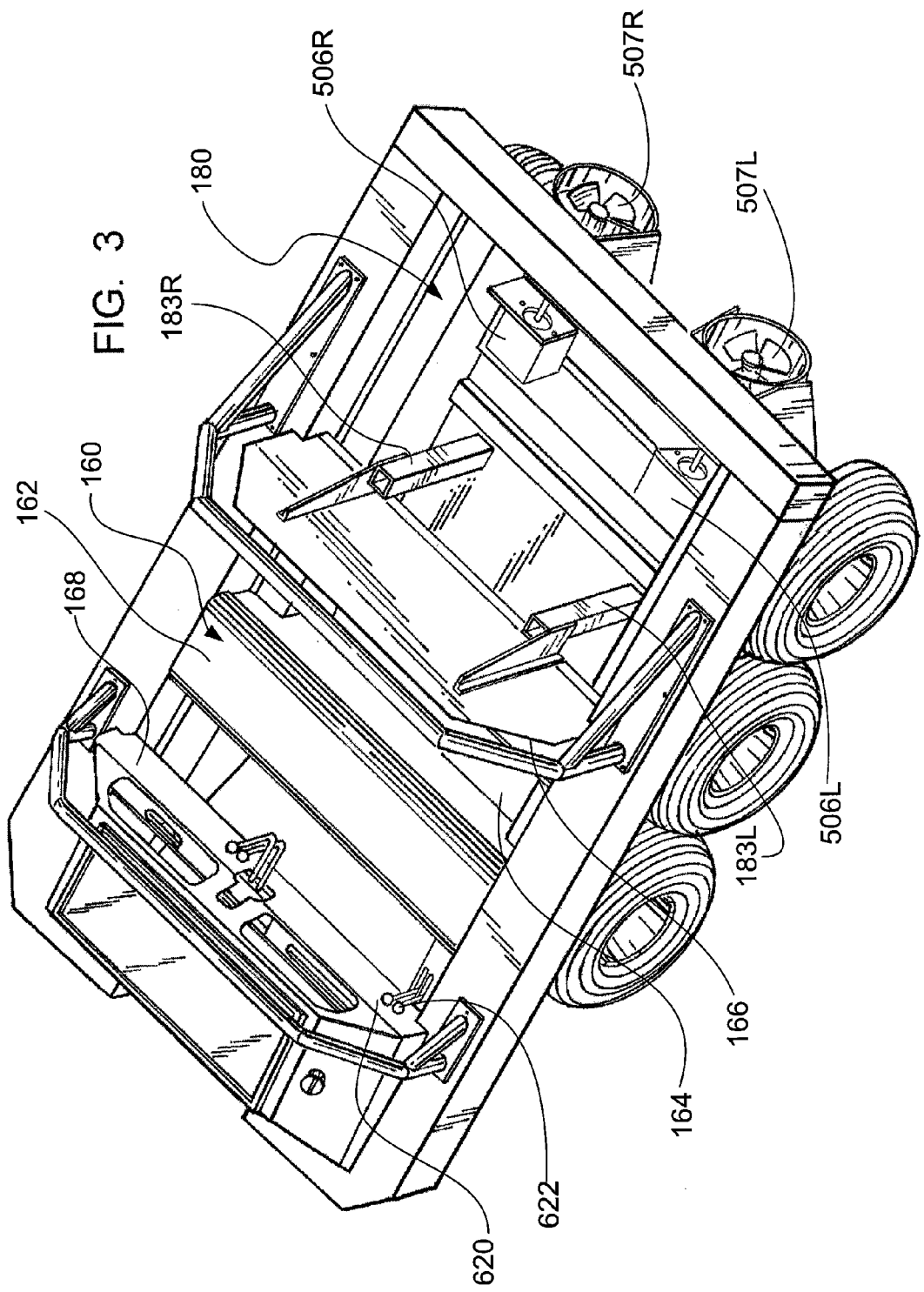
FIG. 3—Perspective view looking down into vehicle with power source and hydraulic components removed.
Figure 11:
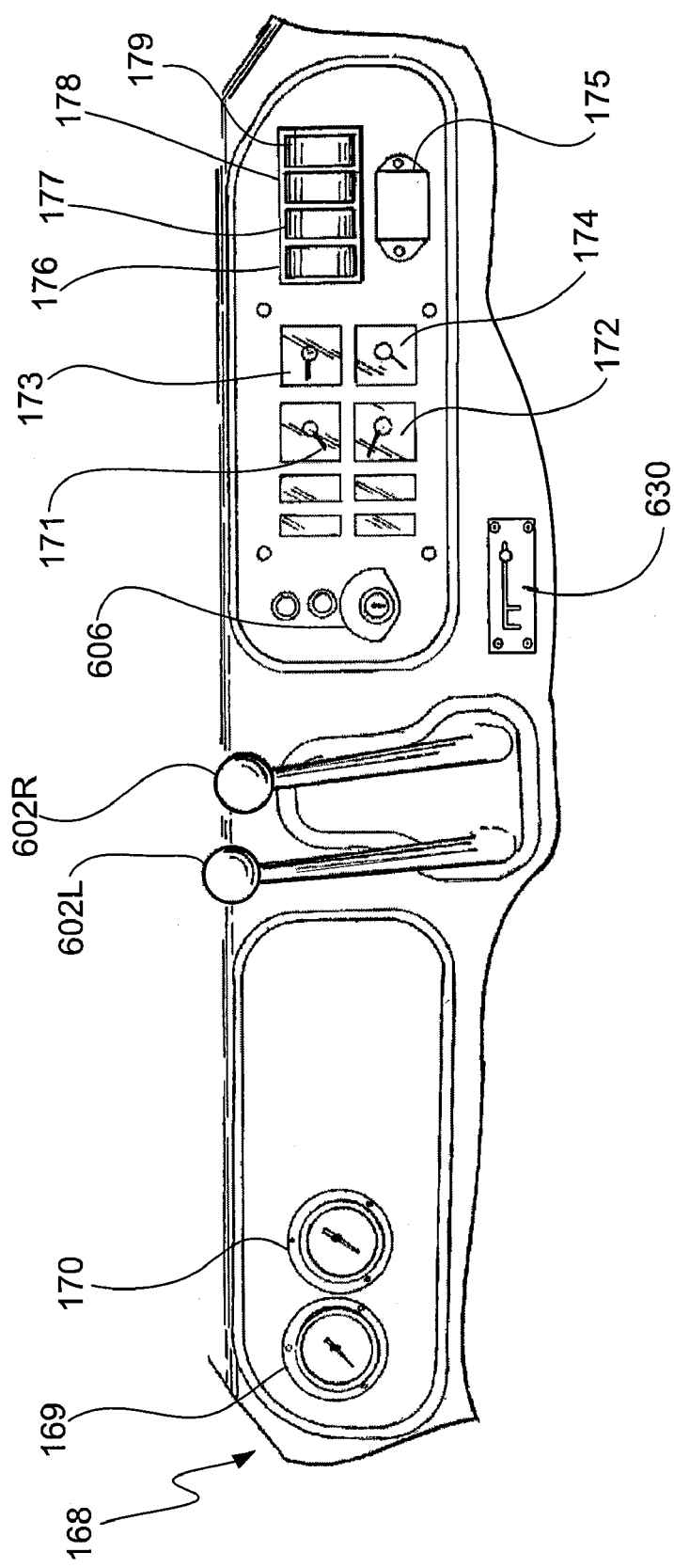
FIG. 11—Diagram of the vehicle's dashboard.
Figure 12A:
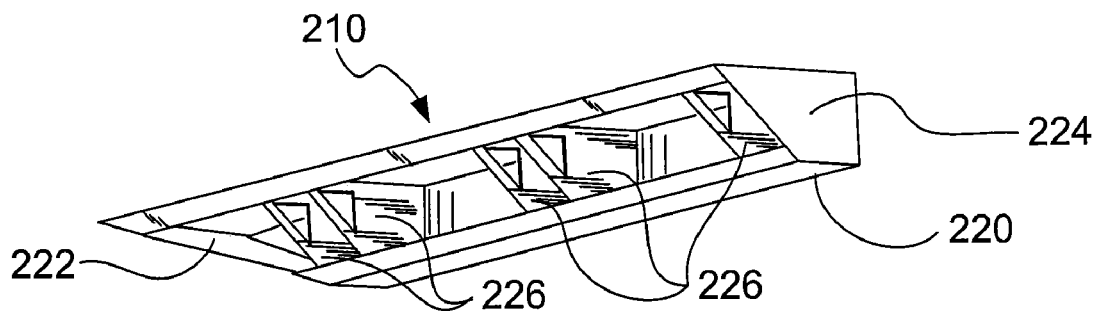
FIGS. 12A, 12B, 12C and 12D—Perspective views of the right wheel motor housings.
Figure 12B:
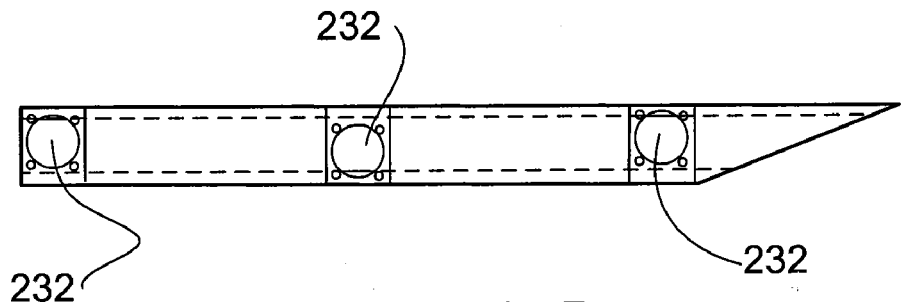
Figure 12C:
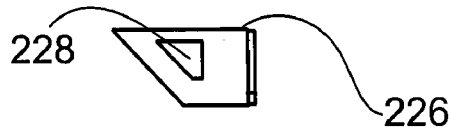
Figure 12D:
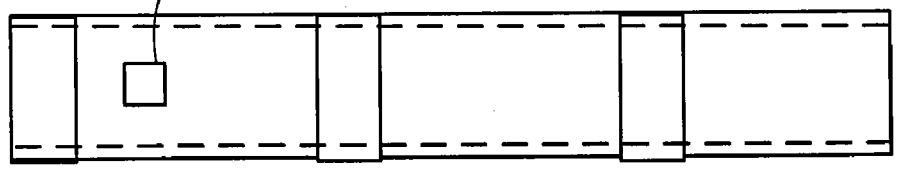
Figure 13:
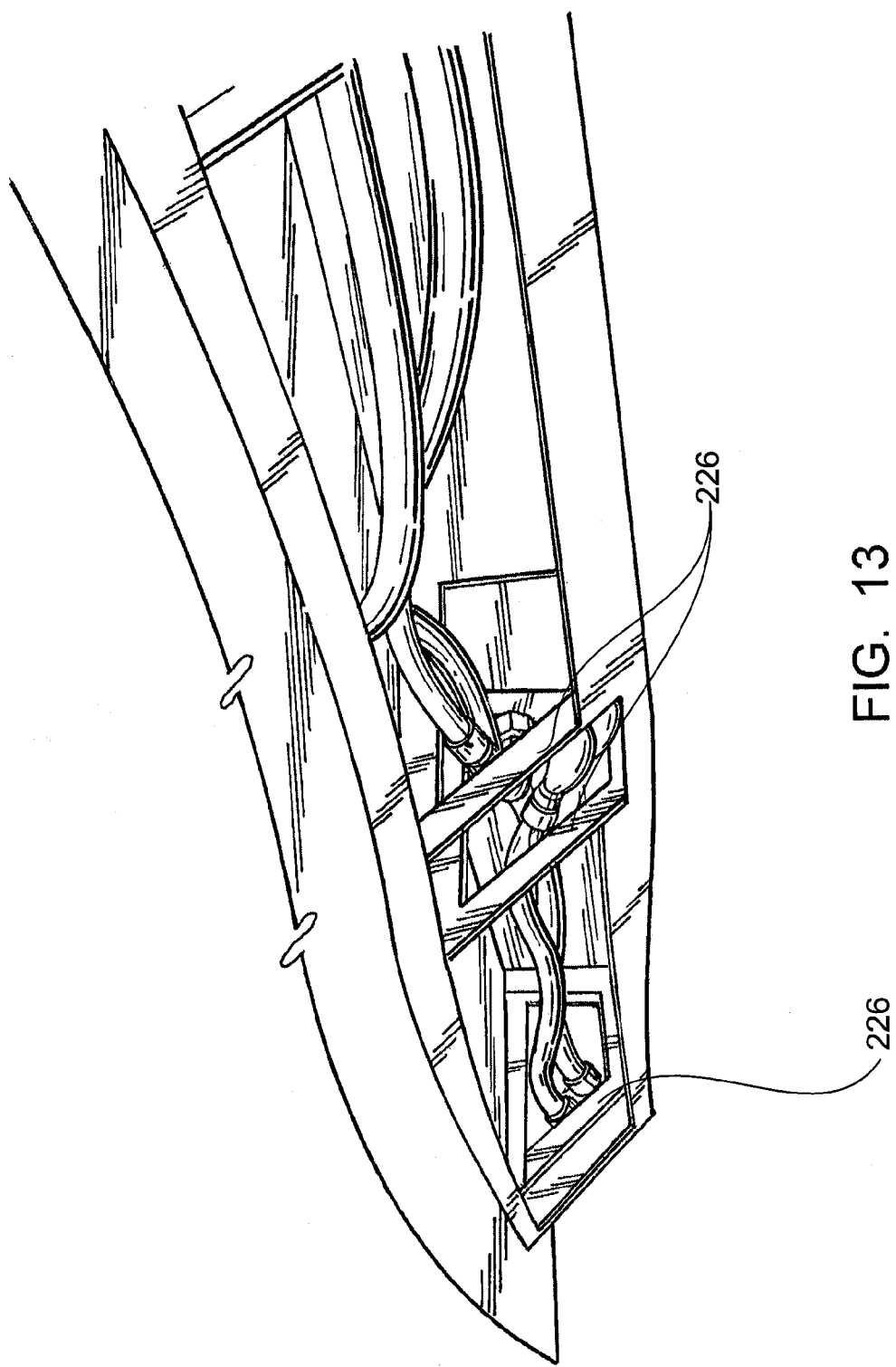
FIG. 13—Stylized perspective of a portion of the right undercarriage assembly.

Referring now to FIG. 3, located inside body assembly 100 is passenger compartment 160 and mechanical compartment 180. Passenger compartment 160 is located in the front half of body assembly and includes front seat 162; back seat 164, which includes backrest 166; propulsion selection levers 620 and 622; and dashboard 168. Now referring to FIG. 11, mounted in dashboard 168 are pressure gauges 169 and 170 for monitoring hydraulic systems 500$l$ and 500$r$; throttle 630 for controlling the output of power source 182; vehicle control levers 602$l$ and 602$r$; ignition switch 606, which is preferably a keyed switch; gauges for monitoring the condition of power source 182 including temperature gauge 171, oil pressure gauge 172, battery voltage indicator 173, fuel gauge 174, and hour meter 175; and a plurality of electrical switches for controlling various electrical components of vehicle 10, including switch 176 for exterior lights, switch 177 for interior lights, switch 178 for the bilge pump, and switch 179 for auxiliary devices.

Mechanical Compartment

Referring again to FIG. 2, mechanical compartment 180 is located in the rear half of body assembly 100, behind backseat 164. Located within mechanical compartment 180 are power source 182, a battery (not shown), a standard, commercially available bilge pump such as the Tsunami Model T1200 (not shown), hydrostatic pumps 502$l$ and 502$r$, hydraulic manifold assemblies 515$l$ and 515$r$ (best seen in FIG. 7), left propeller motor 506$l$, right propeller motor 506$r$, left hose chase 183$l$, and right hose chase 183$r$ (best seen in FIG. 3). Left propeller motor 506$l$ is mounted to the inside surface of left propeller mounting flange 120 preferably using two bolts and sealed using a marine grade adhesive such as Vulkem 626. Right propeller motor 506$r$ is mounted to right propeller mounting flange 122 in an identical fashion. To provide for increased maneuverability in the water, left propeller motor 506$l$ and right propeller motor 506$r$ are counter-rotating motors with appropriate counter-rotating propellers 507$l$ and 507$r$ mounted to the shafts of each motor. The speed control (not shown) on power source 182 is preferably mechanically connected to throttle 630 and still more preferably connected with a cable and pulleys.

Figure 7:
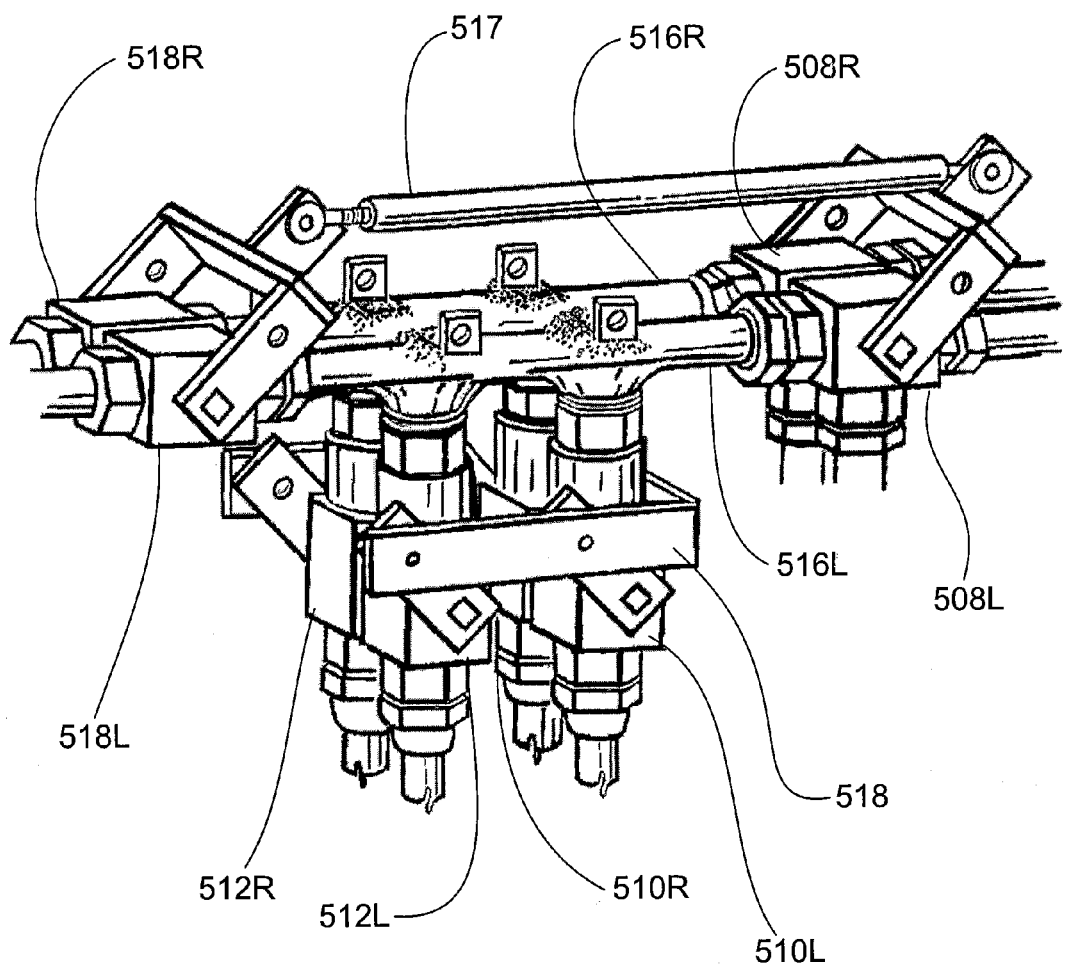
FIG. 7—Perspective view of the hydraulic manifold assembly.
Figure 8:
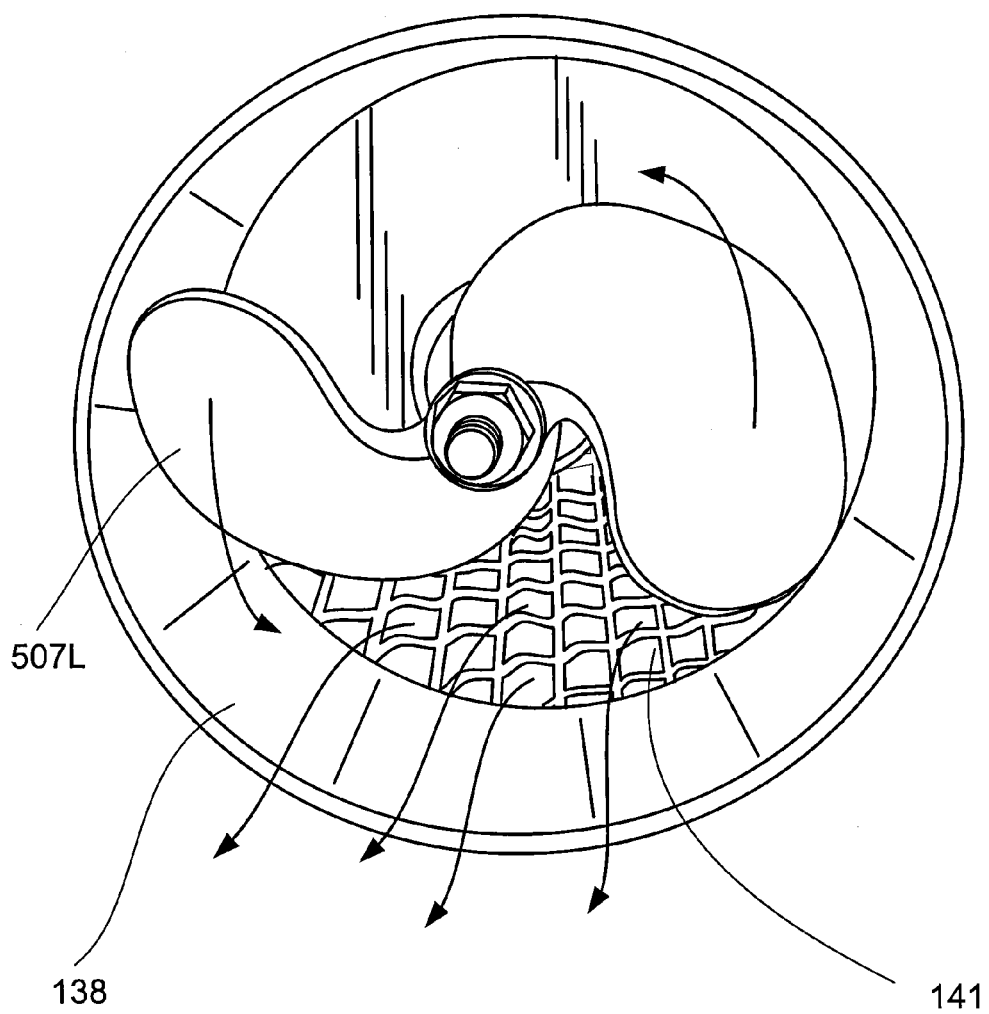
FIG. 8—Perspective view of the valve manifold assembly.

Hydraulic manifold assemblies 515$l$ and 515$r$ are located toward the front of mechanical compartment 180 and include propeller valve yoke 517 and wheel valve yoke 518, as shown in FIG. 7. Propeller valve yoke 517 is mechanically connected to propulsion selection lever 620, preferably using cables and pulleys, and wheel valve yoke 518 is similarly connected to propulsion selection levers 622. The cables are more preferably 5/16 inch diameter push-pull cables.

Hydrostatic pumps 502$l$ and 502$r$ are connected, preferably mechanically, to vehicle control levers 602$l$ and 602$r$ respectively; said connection being more preferably made with cables and pulleys. Levers 602$l$ and 602$r$ preferably have a three inch travel both forward and backward from their central positions. In an alternate embodiment, levers 602$l$ and 602$r$ are self-centering, which can be accomplished using a commercially available self-centering apparatus (not shown) such as model number 1592K13 from Tuthill.

Figure 9:
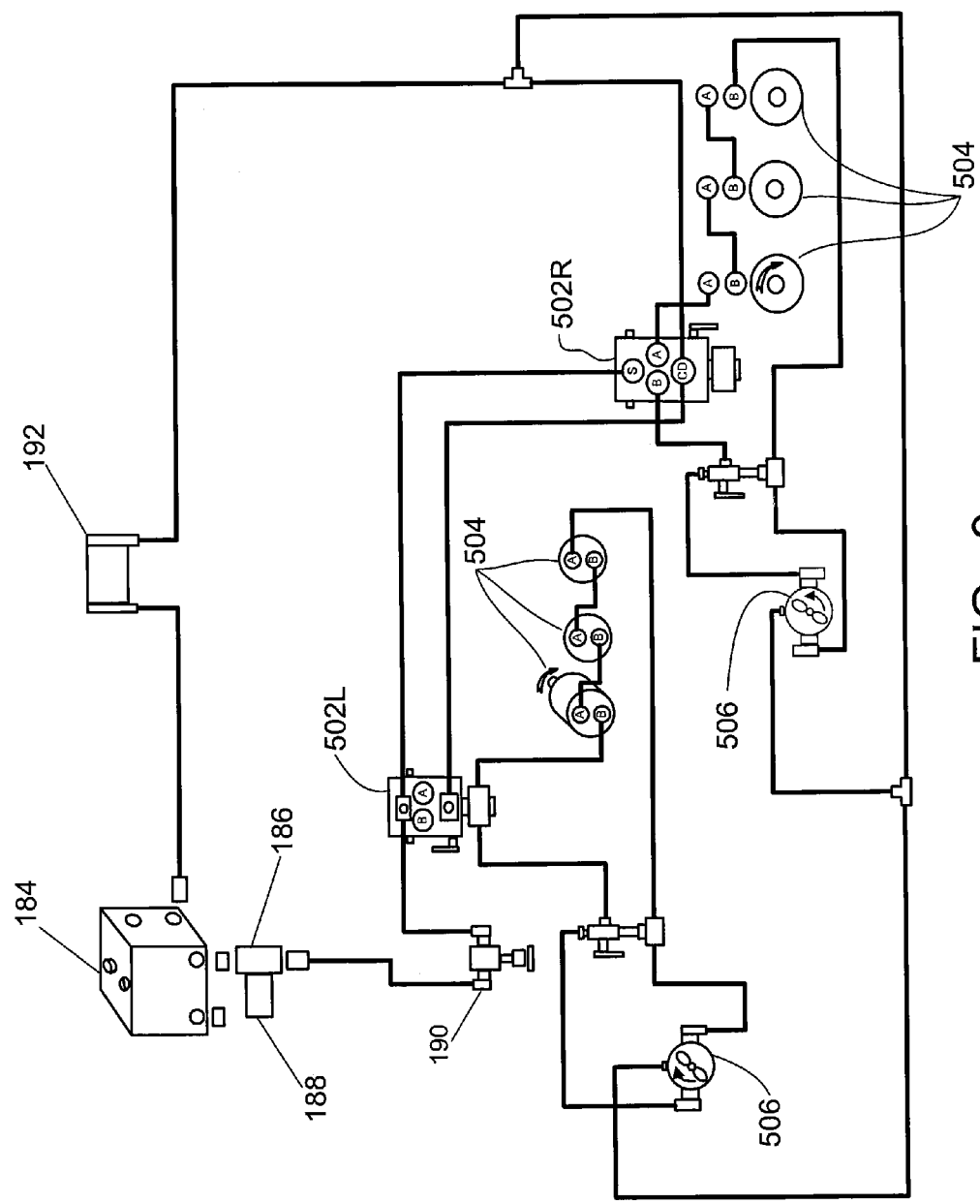
FIG. 9—Diagram of the hydraulic system.

Also located in mechanical compartment 180 are other components necessary to form a functional hydrostatic system that are readily available commercially. These components may include oil reservoir 184; filter head 186, such as model K22 from Parker Hannifin Corporation containing an appropriate filter element; charge pump 190, such as model CL050 from Danfoss; and oil cooler 192, such as model TR3 from Thermal Transfer Products. These items are shown in FIG. 9, which is a diagram of the hydraulic system removed from vehicle 10.

Undercarriage

Referring again to FIG. 2, body assembly 100 is mounted on an undercarriage that is comprised of two separate undercarriage assemblies, 200$l$ and 200$r$, that are preferably conjoined to body assembly 100 by welding. Because undercarriage assembly 200$l$ is a mirror image of undercarriage assembly 200$r$, only undercarriage assembly 200$r$ will be described in detail with the understanding that undercarriage assembly 200$l$ is comprised of components that are the mirror image of the components of undercarriage assembly 200$r$.

Undercarriage assembly 200r is comprised of channel assembly 210, access cover 202, wheel motors 504, and tires 203. Channel assembly 210 (see FIG. 12) is further comprised of channel 220, front end plate 222, rear end plate 224, and central partitions 226. Channel 220 defines aperture 252 that aligns with hose chase 183 to allow hydraulic lines to be routed from mechanical compartment 180 into undercarriage assembly 200r. Central partitions 226 each define aperture 228 therethrough to allow the hydraulic lines to be routed to wheel motors 504. Access cover 202 provides a smooth surface that slopes away from the longitudinal centerline of the vehicle to provide improve ground clearance and to eliminate projections that could get hung up on obstructions such as rocks and stumps.

Channel 220 further defines a plurality of wheel motor apertures 232 through which the shaft of each wheel motor 504 passes. One tire 503 is mounted to the shaft of each wheel motor 504. In alternative embodiments a second tire is connected directly to the shaft of each wheel motor 504 or to each tire 503 to give the vehicle a dual wheel capability that is advantageous in certain conditions or to use with a track.

Once wheel motors 504 are mounted within channel assembly 210 and the hydraulic lines are connected, the remaining space within in channel assembly 210 is preferably filled with closed cell expanded bead polystyrene foam to increase buoyancy and to prevent undercarriage assembly 200 from filling completely with water since access cover 202 preferably does not create a watertight seal.

Hydraulic Propulsion System

Vehicle 10 is powered by a single power source 182 that is preferably a 45 to 55 horsepower gas or diesel engine such as the 50 h.p. turbo diesel model available from Kubota Engine America. Power source 182 includes an alternator (not shown) that provides electrical power to vehicle 10. Power source 182 also provides power to a pair of identical, closed hydraulic systems to deliver power to the driving mechanisms on the left and right side of the vehicle. To simplify the description of these identical hydraulic systems, the identical components in both systems will be represented by a single number. Where it is necessary to refer to a component in only one of the subsystems, that part will be designated by the number followed by the letter "l" for a component in the hydraulic system powering the left side of the vehicle and by the letter "r" to designate a component in the hydraulic system powering the right side of the vehicle. For example, the hydraulic system powering the left side of the vehicle will be designated 500l and the hydraulic system powering the right side of the vehicle will be designated 500r when it is necessary to distinguish between them. When no distinction is required, the hydraulic systems will be referred to generically, i.e. hydraulic system 500.

Figure 14:
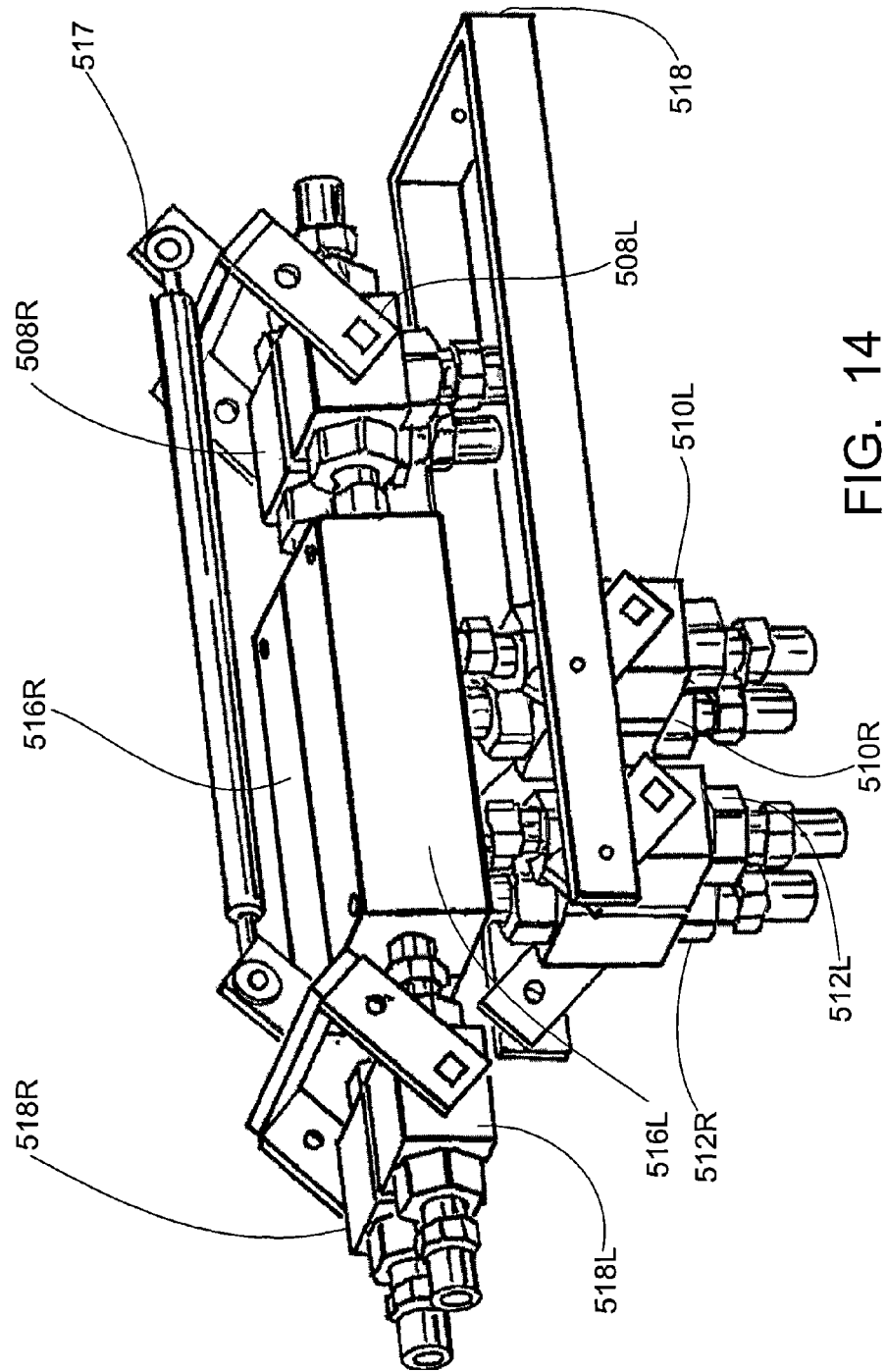
FIG. 14—Perspective view of an alternative embodiment of the hydraulic manifold assembly.

Referring now to FIG. 5, hydraulic system 500 is a closed loop, hydrostatic system that includes hydrostatic pump 502 that can deliver a variable flow rate of hydraulic fluid in either direction through the closed system. Hydrostatic pump 502 is rotatably connected to power source 182 and is preferably a Sauer Danfoss M25-2132. Pump 502 is fluidly connected to a plurality (preferably three) of wheel motors 504 that are fluidly connected in series (collectively wheel motor series 505) and propeller motor 506 using hydraulic manifold assembly 515, "tee" 514, and ⅝" diameter hydraulic lines to connect said components. Hydraulic manifold assembly 515 is comprised of three-way valve 508, wheel motor valve 510, wheel motor bypass valve 512, propeller motor isolation valve 518, and manifold 516 (best seen in FIG. 7). Manifold 516 is preferably a welded tube that defines four ports for attaching said valves, preferably using SAE O-ring connectors, and internal passages fluidly connecting said valves as shown in FIG. 7. Alternatively, manifold 516 could be a machined block defining four ports connected to an internal passage in said block as shown in FIG. 14 and the connection of the valves to the block could be using SAE O-ring connectors, threaded connection, or some other leak proof connection.

Wheel motors 504 preferably have a displacement of 335 cc/rev such as model TG335 from Parker Hannifin Corporation, and propeller motor 506 preferably has a displacement of 22 cc/rev such as model PGM 330 from Parker Hannifin Corporation. Three-way valve 508 is preferably a mechanically actuated three-way ball valve such as model HBV3 from Parker Hannifin Corporation. Wheel motor valve 510, wheel motor bypass valve 512, and propeller motor isolation valve 518 are preferably mechanically operated two-way ball valves such as model HBV2 from Parker Hannifin Corporation.

As best seen in FIGS. 5A, 5B, 5C, and 5D, hydrostatic pump 502 is fluidly located between tee 514 and three-way valve 508. The remaining two ports in three-way valve 508 are fluidly connected to propeller motor 506 and manifold 516. Propeller motor 506 is then fluidly connected to propeller isolation valve 518. Propeller isolation valve 518 is further fluidly connected to manifold 516. Wheel motor valve 510 is fluidly located between manifold 516 and wheel motor series 505, and wheel motor series 505 is further fluidly connected to tee 514. The remaining port of manifold 516 is fluidly connected to wheel motor bypass valve 512, which is further fluidly connected to tee 514.

Still referring to FIGS. 5A, 5B, 5C, and 5D flow through hydraulic system 500 for the various modes of operation is indicated by arrows. The direction of the arrow indicates the direction of flow when vehicle 10 is being propelled in a forward direction. When the vehicle is operated in reverse, the flow path remains the same for a given mode, but the direction of flow is reversed. Also, a closed valve is indicated by an "X" within the valve.

Figure 5A:
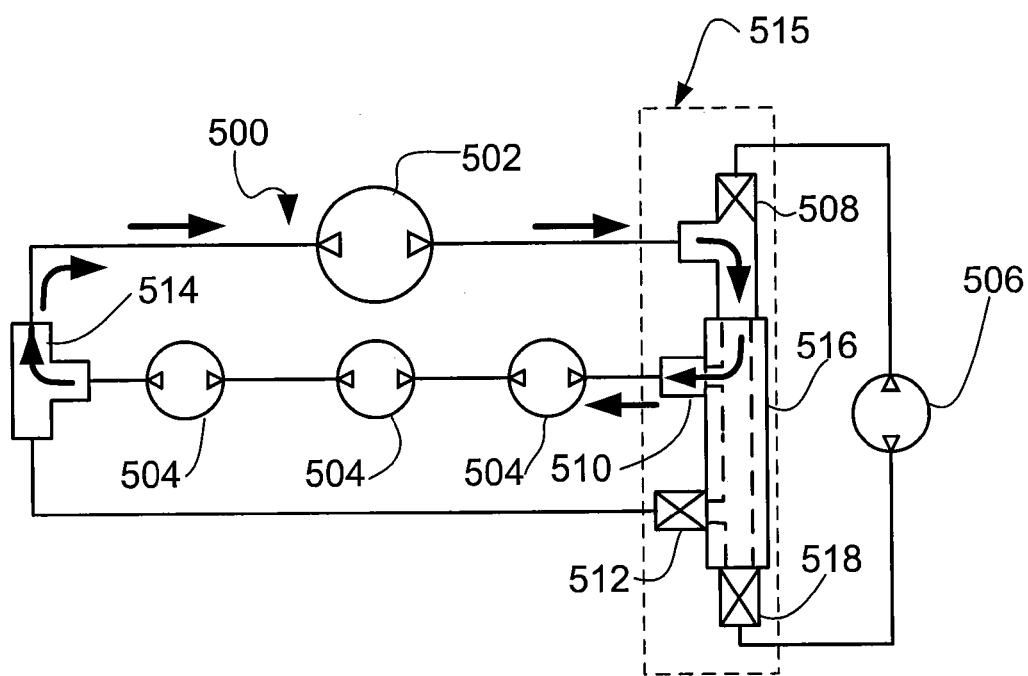
FIGS. 5A, 5B, 5C, 5D—Diagram of hydraulic flow paths.

As can be seen in FIG. 5A, when vehicle 10 is operated in wheels only mode to be driven in a forward direction, output from hydrostatic pump 502 is directed toward three-way valve 508. Three-way valve 508 then directs said output into manifold 516. Wheel motor bypass valve 512 is in its closed position causing said output to exit manifold 516 through wheel motor valve 510, which is in its open position. Said output then flows through wheel motor valve 510, which is in its open position, and then flows through and drives wheel motors 504. After said output exits the last wheel motor 504 in wheel motor series 505, said output returns to hydrostatic pump 502 via tee 514. Said output must exit tee 514 toward hydrostatic pump 502 because the alternate flow path from tee 514 is blocked by wheel motor bypass valve 512 that is in its closed position. Additionally, propeller isolation valve 518 is in its closed position to prevent propeller motor 506 from being exposed to high pressure while vehicle 10 is operating in wheels only mode.

Figure 5B:
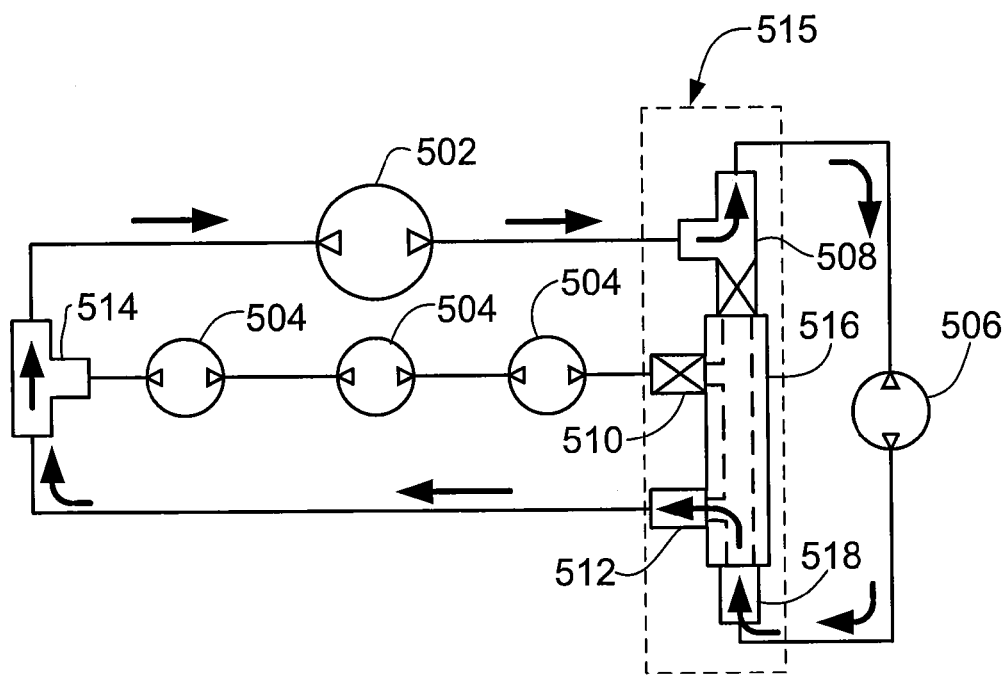

As can be seen in FIG. 5B, when vehicle 10 is operated in propeller only mode to be driven in a forward direction, output from hydrostatic pump 502 is directed toward three-way valve 508. Three-way valve 508 then directs said output toward propeller motor 506. After passing through and driving propeller motor 506, said output flows through propeller isolation valve 518, which is in its open position, and into manifold 516. Said output exits manifold 516 through wheel motor bypass valve 512, which is in its open position, and returns to hydrostatic pump 502 via tee 514. Said output cannot flow through wheel motor series 505 from hydraulic manifold assembly 515 or tee 514 because wheel motor valve 510 is in its closed position.

Figure 5C:
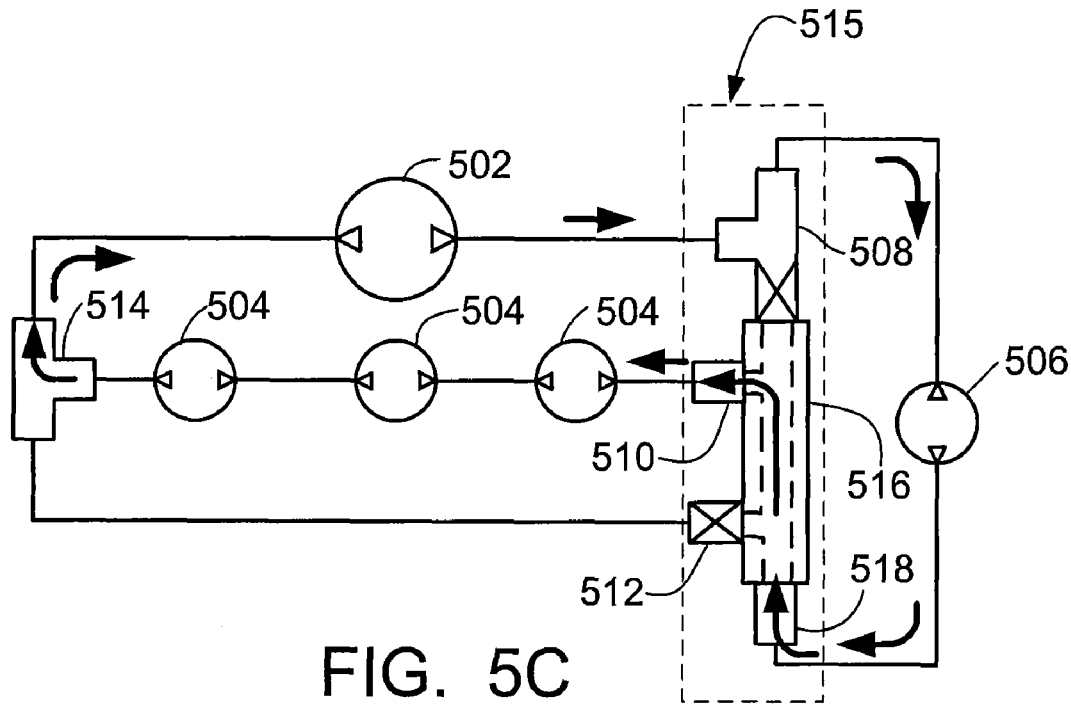

As can be seen in FIG. 5C, when vehicle 10 is operated in combined wheel and propeller mode to be driven in a forward direction, output from hydrostatic pump 502 is directed toward three-way valve 508. Three-way valve 508 then directs said output toward propeller motor 506. After passing through and driving propeller motor 506, said output flows through propeller isolation valve 518, which is in its open position, and into manifold 516. Said output exits manifold 516 and flows through wheel motor valve 510, which is in its open position, because flow is prevented from exiting hydraulic manifold assembly 515 through wheel motor bypass valve 512 because it is in its closed position. Said output then flows through and drives wheel motors 504. After said output exits the last wheel motor 504 in wheel motor series 505, said output returns to hydrostatic pump 502 via tee 514. Said output must exit tee 514 toward hydrostatic pump 502 because the alternate flow path from tee 514 is blocked by wheel motor bypass valve 512 that is in its closed position.

As can be seen by one of ordinary skill in the art, vehicle 10 can be operated in reverse in any of the modes listed above by reversing the direction of the output from hydrostatic pump 502 and keeping the valves in the same states discussed above.

Figure 5D:
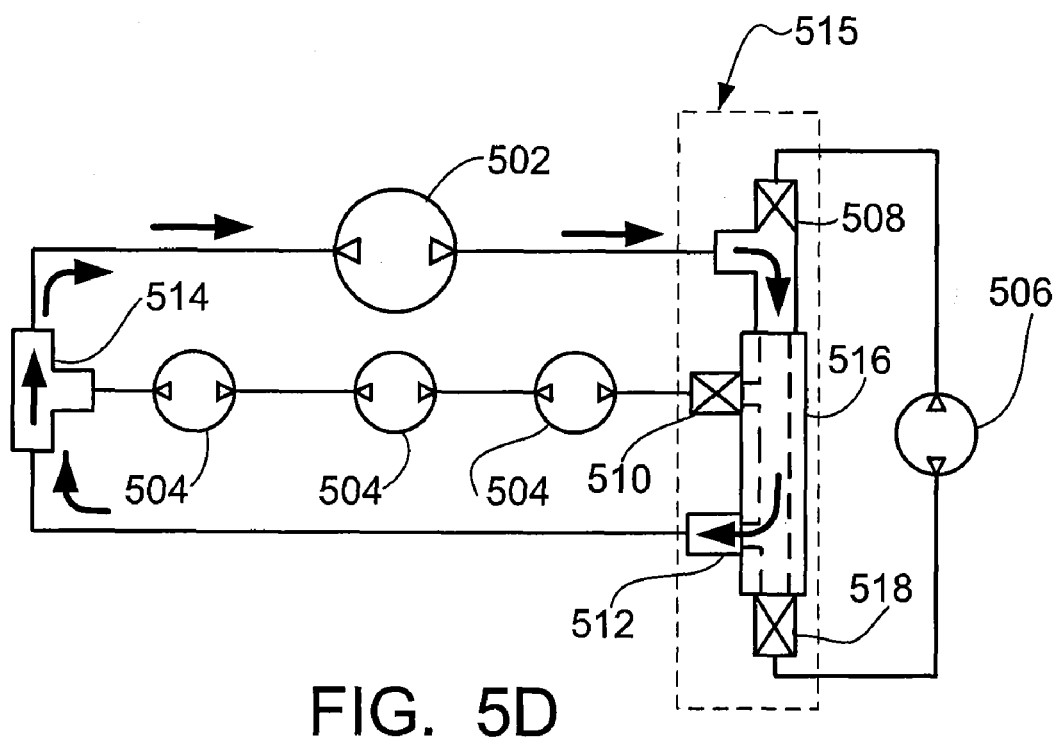

FIG. 5D represents the flow path taken by the output from hydrostatic pump 502 when a neutral mode of operation is selected. In this neutral mode of operation, output from hydrostatic pump bypasses both propeller motor 506 and wheel motor series 505.

Operation of Vehicle

1. Selecting Operation Mode of Vehicle 10

Figure 10A:
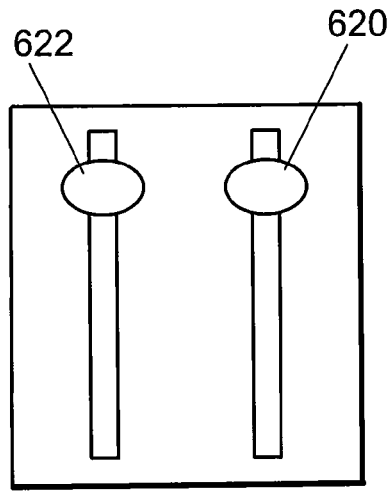
FIGS. 10A, 10B, 10C and 10D—Diagram showing how vehicle propulsion levers select the vehicle's mode of operation.
Figure 10B:
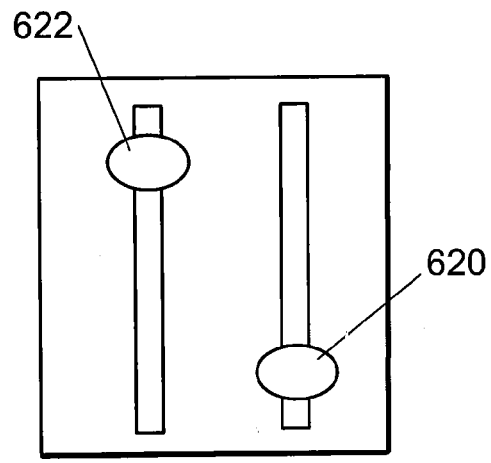
Figure 10C:
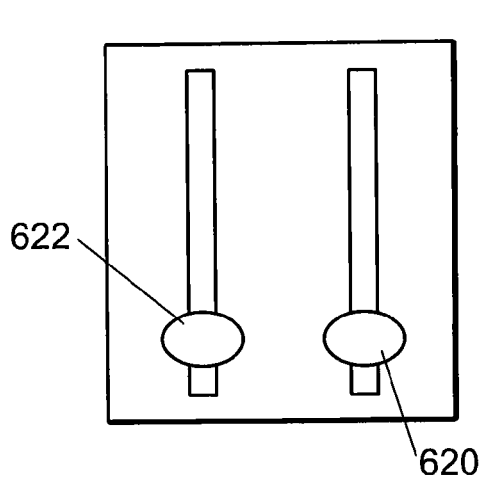
Figure 10D:
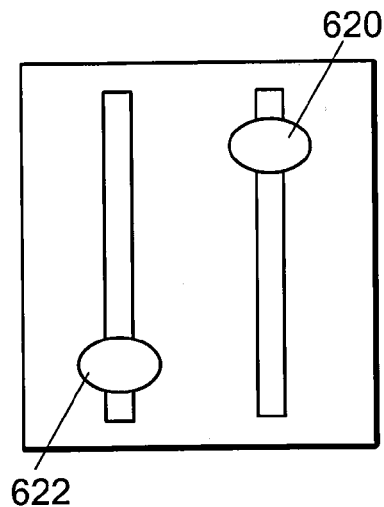

Propulsion selection levers 620 and 622 determine the method of operation, i.e. which propulsion motors are engaged, and the chosen method applies to both the left and right side propulsion systems. Lever 620 is mechanically connected to three-way valves 508*l* and 508*r* and propeller isolation valves 518*l* and 518*r* via propeller valve yoke 517; Lever 622 is mechanically connected to wheel motor valves 510*l* and 510*r* and wheel motor bypass valves 512*l* and 512*r* via wheel valve yoke 518. When both levers 620 and 622 are in their forward positions (FIG. 10A), vehicle 10 operates in wheels only mode as described above and shown in FIG. 5A. When lever 620 is moved to its rearward position and lever 622 remains in its forward position, (FIG. 10B), the positions of three-way valves 508*l* and 508*r* are changed and propeller isolation valves 518*l* and 518*r* are opened to direct the output of hydrostatic pump 502 through propeller motor 506 and wheel motors 504 in series, as described above and shown in FIG. 5C, putting vehicle 10 into combined wheel and propeller drive. When lever 622 is moved to its rearward position, putting both levers 620 and 622 in their rearward positions (FIG. 10C), wheel motor valve 510 is closed and wheel motor bypass valve 512 is opened, as described above and shown in FIG. 5C, putting vehicle 10 into propeller only operation. Finally, when lever 620 is in it forward position and lever 622 is in its rearward position (FIG. 10D), vehicle 10 is in its neutral mode of operation, and the output from hydrostatic pump 502 is directed through circuit described above and shown in FIG. 5D in which the output bypasses both wheel motor series 505 and the propeller motor 506.

2. Starting Vehicle 10

The first step in operating vehicle 10 is to start power source 182. This is accomplished by placing vehicle 10 in its neutral mode of operation by placing propulsion lever 620 in its forward position and propulsion lever 622 in its rearward position. This position is confirmed through the use of a pair of normally open electrical switches (not shown) that are closed by placing levers 620 and 622 in the specified positions, which allows ignition switch 606, preferably a keyed switch, to start power source 182. Once power source 182 is started, the mode of propulsion is selected as discussed above.

Figure 6A:
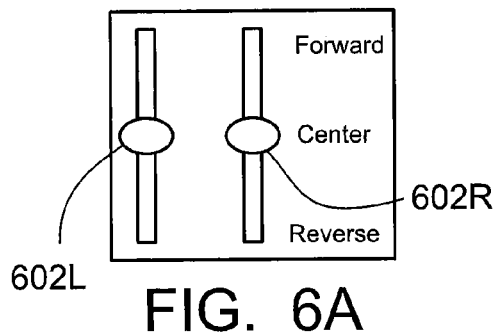
FIGS. 6A, 6B, 6C, 6D, 6E—Diagram showing how vehicle control levers operate the vehicle.
Figure 6B:
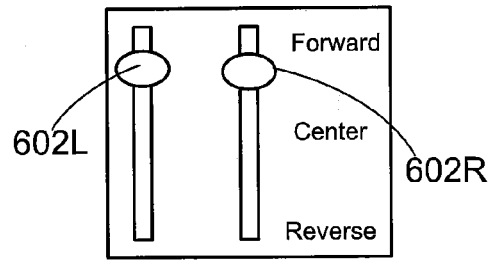
Figure 6C:
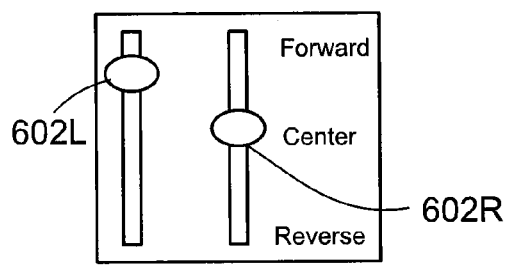
Figure 6D:
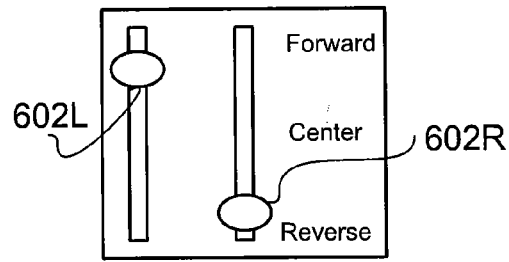
Figure 6E:
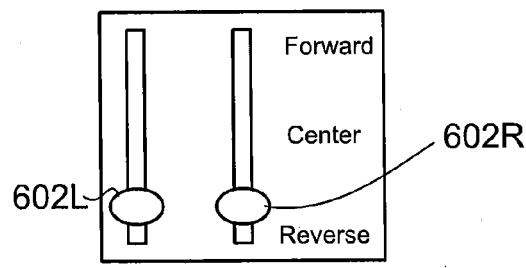

To move vehicle 10 forward in a straight line, levers 602*l* and 602*r* are moved forward simultaneously from their central positions, as shown in FIG. 6B, to provide hydraulic power to wheel motors 504 or propeller motors 506 or both. To move vehicle 10 backward in a straight line, levers 602*l* and 602*r* are moved backward simultaneously from their central positions, as shown in FIG. 6E, to provide hydraulic power to wheel motors 504 or propeller motors 506 or both.

3. Controlling the Speed of Vehicle 10

The speed of vehicle 10 is controlled by a combination of vehicle control levers 602*l* and 602*r* and throttle 630. The further away from their central positions levers 602*l* and 602*r* are moved, the greater the output from hydrostatic pump 502 and the faster the propulsion motors will rotate. Throttle 630 is mounted in dashboard 168 and is mechanically linked to power source 182 and preferably provides four different throttle settings: idle, low, medium, and high. Throttle 630 controls the range of speed that can be achieved by the operation of levers 602*l* and 602*r*. The higher the throttle setting, the faster vehicle 10 can travel.

4. Turning Vehicle 10

Vehicle 10 is turned by creating a differential in the location of levers 602*l* and 602*r* relative to the levers' central positions—the greater the differential the smaller the radius of the turn. To execute a gradual turn to the right, lever 602*l* is moved farther forward from its central position than lever 602*r*, as shown in FIG. 6C, resulting in the engaged propulsion motors on the left side of vehicle 10 rotating at a higher rate than the engaged propulsion motors on the rights side of vehicle 10 causing vehicle 10 to turn. The larger the differential between the positions of levers 602*l* and 602*r*, the smaller the radius of the turn. To execute a very sharp turn to the right, lever 602*l* is moved forward from its central position, causing the engaged propulsion motors on the left side of vehicle 10 to rotate in a forward direction, while lever 602*r* is simultaneously moved backward from its central position, causing the engaged propulsion motors on the right side of vehicle 10 to rotate in a reverse direction, as shown in FIG. 6D. Finally, as would be evident to one of ordinary skill in the art, turns to the left are accomplished by reversing the positions of levers 602*l* and 602*r* discussed above.

I claim:

1. An amphibious all-terrain vehicle comprising:
a body assembly, said body assembly further comprising
a passenger compartment housing a pair of propulsion selection levers;
a mechanical compartment housing a power source, a left hydrostatic pump, a right hydrostatic pump, a left hydraulic propeller motor, a right hydraulic propeller motor, a left hydraulic manifold assembly, and a right hydraulic manifold assembly;
a left undercarriage assembly; said left undercarriage assembly
being conjoined to a bottom of said body assembly along a left edge of said body assembly and
housing a left plurality of hydraulic wheel motors connected in series such that said left plurality of wheel motors are external to the body assembly;

a right undercarriage assembly; said right undercarriage assembly
being conjoined to the bottom of said body assembly along a right edge of said body assembly and
housing a right plurality of hydraulic wheel motors connected in series such that said right plurality of wheel motors are external to the body assembly, said right plurality of wheel motors being identical in number to the left plurality of wheel motors;
said left and right hydrostatic pumps being rotatably connected to said power source and fluidly connected to said left and right hydraulic manifold assemblies respectively;
whereby a variable flow of hydraulic fluid output from said left and right hydrostatic pumps is selectively directed through the left and right pluralities of wheel motors only, through the left and right pluralities of wheel motors and the left and right hydraulic propeller motors, through the left and right hydraulic propeller motors only, or through neither the left and right pluralities of wheel motors nor the left and right hydraulic propeller motors using the propulsion selection levers.

2. The vehicle of claim 1 further comprising
a left hose chase and a right hose chase located in the mechanical compartment, each of said left and right hose chases defining a upper opening in its upper end portion and a lower opening in its lower end portion, said upper openings being located above the waterline of the vehicle;
an opening defined in the upper surface of each of the left and right undercarriage assemblies that aligns with the lower opening in the lower end portion of each of the left and right hose chases respectively;
a left set of hydraulic lines routed through the left hose chase and the opening defined in the upper surface of the left undercarriage assembly fluidly connecting the left hydrostatic pump and the left hydraulic manifold assembly to the left plurality of wheel motors; and
a right set of hydraulic lines routed through the right hose chase and the opening defined in the upper surface of the right undercarriage assembly fluidly connecting the right hydrostatic pump and the right hydraulic manifold assembly to the right plurality of wheel motors.

3. The vehicle of claim 2 wherein each of the hydraulic manifold assemblies further comprises:
a manifold, said manifold defining four ports with the first and fourth ports being defined in opposing end portions of the manifold and the second and third ports being defined in the side portion of the manifold and located intermediate the first and second end portions of the manifold;
a three-way valve fluidly connected between the hydrostatic pump, the first port defined in said manifold, and the hydraulic propeller motor, whereby said three-way valve selectively allows fluid flow between the hydrostatic pump and either the manifold or the hydraulic propeller motor;
a propeller motor isolation valve fluidly connected between the hydraulic propeller motor and the manifold, said propeller motor isolation valve being mechanically connected to said three-way valve whereby when said three-way valve selectively allows fluid flow between the hydrostatic pump and the manifold said propeller motor isolation valve is closed to fluid flow and when said three-way valve selectively allows fluid flow between the hydrostatic pump and the hydraulic propeller motor said propeller motor isolation valve is open to fluid flow, thereby allowing fluid flow between the manifold and the hydraulic propeller motor;
a wheel motor valve fluidly connected between the second port defined in the manifold and the plurality of wheel motors; and
a wheel motor bypass valve fluidly connected between the third port defined in the manifold and the hydrostatic pump and mechanically connected to said wheel motor valve whereby when said wheel motor valve is open to fluid flow between the manifold and the plurality of wheel motors said wheel motor bypass valve is closed to fluid flow between the manifold and the hydrostatic pump and when said wheel motor valve is closed to fluid flow between the manifold and the plurality of wheel motors said wheel motor bypass valve is open to fluid flow between the manifold and the hydrostatic pump.

4. The vehicle of claim 3 wherein the three-way valves on the left and right hydraulic manifold assemblies are mechanically connected to each other, the propeller motor isolation valves on the left and right hydraulic manifold assemblies are mechanically connected to each other, the wheel motor valves on the left and right hydraulic manifold assemblies are mechanically connected to each other, and the wheel motor bypass valves on the left and right hydraulic manifold assemblies are mechanically connected to each other such that the corresponding valves in the first hydraulic manifold assembly and the second hydraulic manifold assembly permit fluid flow along identical paths.

5. The vehicle of claim 4 further comprising
a mechanical connection between the first propulsion selection lever and the left and right hydraulic manifold assemblies whereby the fluid flow through three-way valves and the propeller isolation valves can be controlled and
a mechanical connection between the second propulsion selection lever and the left and right hydraulic manifold assemblies whereby the fluid flow through wheel motor valves and the wheel motor bypass valves can be controlled.

6. The vehicle of claim 5 wherein the mechanical connection between the first propulsion selection lever and the left and right hydraulic manifold assemblies is a push-pull cable and the mechanical connection between the second propulsion selection lever and the left and right hydraulic manifold assemblies is a push-pull cable.

7. The vehicle of claim 4 wherein said passenger compartment includes means for controlling said vehicle.

8. An amphibious all-terrain vehicle comprising:
a body assembly, said body assembly further comprising
a passenger compartment housing a pair of propulsion selection levers;
a mechanical compartment housing a power source, a left hydrostatic pump, a right hydrostatic pump, a left hydraulic propeller motor, a right hydraulic propeller motor, a left hydraulic manifold assembly, and a right hydraulic manifold assembly;
a left undercarriage assembly; said left undercarriage assembly
being conjoined to a bottom of said body assembly along a left edge of said body assembly and
housing a left plurality of hydraulic wheel motors connected in series;
a right undercarriage assembly; said right undercarriage assembly
being conjoined to the bottom of said body assembly along a right edge of said body assembly and housing a right plurality of hydraulic wheel motors connected in series;

said left and right hydrostatic pumps being rotatably connected to said power source and fluidly connected to said left and right hydraulic manifold assemblies respectively;

whereby a variable flow of hydraulic fluid from said left and right hydrostatic pumps is selectively directed through the left and right pluralities of wheel motors only, through the left and right pluralities of wheel motors and the left and right hydraulic propeller motors, through the left and right hydraulic propeller motors only, or through neither the left and right pluralities of wheel motors nor the left and right hydraulic propeller motors using the propulsion selection levers;

a left hose chase and a right hose chase located in the mechanical compartment, each of said left and right hose chases defining a upper opening in its upper end portion and a lower opening in its lower end portion, said upper openings being located above the waterline of the vehicle;

an opening defined in the upper surface of each of the left and right undercarriage assemblies that aligns with the lower opening in the lower end portion of each of the left and right hose chases respectively;

a left set of hydraulic lines routed through the left hose chase and the opening defined in the upper surface of the left undercarriage assembly fluidly connecting the left hydrostatic pump and the left hydraulic manifold assembly to the left plurality of wheel motors; and a right set of hydraulic lines routed through the right hose chase and the opening defined in the upper surface of the right undercarriage assembly fluidly connecting the right hydrostatic pump and the right hydraulic manifold assembly to the right plurality of wheel motors.

9. An amphibious all-terrain vehicle comprising:

a body assembly, said body assembly further comprising
  a floor having an inner surface and an outer surface;
  a passenger compartment;
  a mechanical compartment, said mechanical compartment including a first hydrostatic pump that outputs hydraulic fluid at a variable flow rate, a first hydraulic manifold assembly in fluid connection with the first hydrostatic pump capable, a second hydrostatic pump that outputs hydraulic fluid at a variable flow rate, a second hydraulic manifold assembly in fluid connection with the second hydrostatic pump, a left hydraulic propeller motor in fluid connection with the first hydraulic manifold assembly, a right hydraulic propeller motor in fluid connection with the second hydraulic manifold assembly, and a left hose chase and a right hose chase, each of said left and right hose chases defining a upper opening in its upper end portion and a lower opening in its lower end portion, said upper openings being located above a waterline of the vehicle;

a left undercarriage assembly, said left undercarriage assembly
  being affixed to the outer surface of the floor of said body assembly along a left edge of said body assembly and having an opening that aligns with the lower opening of the left hose chase when said left undercarriage assembly is affixed to the outer surface of the floor assembly and
  housing a left plurality of hydraulic wheel motors connected in series, said left plurality of wheel motors being fluidly connected to the first hydraulic manifold assembly using a pair of hydraulic lines routed through the left hose chase and said left plurality of motors being external to the body assembly;

a right undercarriage assembly, said right undercarriage assembly
  being affixed to the outer surface of the floor of said body assembly along a right edge of said body assembly and having an opening that aligns with the lower opening of the right hose chase when said right undercarriage assembly is affixed to the outer surface of the floor assembly and
  housing a right plurality of hydraulic wheel motors connected in series, said right plurality of wheel motors being fluidly connected to the second hydraulic manifold assembly using a pair of hydraulic lines routed through the right hose chase and said right plurality of motors being external to the body assembly;

whereby the first hydraulic manifold assembly selectively delivers the output provided by the first hydrostatic pump to the left plurality of hydraulic wheel motors or the left hydraulic propeller motor or both the left plurality of hydraulic wheel motors and the left hydraulic propeller motor and the second hydraulic manifold assembly selectively delivers the output provided by the second hydrostatic pump to the right plurality of hydraulic wheel motors or the right hydraulic propeller motor or both the right plurality of hydraulic wheel motors and the right hydraulic propeller motor.

10. The vehicle of claim 9 wherein each of the hydraulic manifold assemblies further comprises:

a manifold, said manifold defining four ports with the first and fourth ports being defined in opposing end portions of the manifold and the second and third ports being defined in the side portion of the manifold and located intermediate the first and second end portions of the manifold;

a three-way valve fluidly connected between the hydrostatic pump, the first port defined in said manifold, and the hydraulic propeller motor, whereby said three-way valve selectively allows fluid flow between the hydrostatic pump and either the manifold or the hydraulic propeller motor;

a propeller motor isolation valve fluidly connected between the hydraulic propeller motor and the manifold, said propeller motor isolation valve being mechanically connected to said three-way valve whereby when said three-way valve selectively allows fluid flow between the hydrostatic pump and the manifold said propeller motor isolation valve is closed to fluid flow and when said three-way valve selectively allows fluid flow between the hydrostatic pump and the hydraulic propeller motor said propeller motor isolation valve is open to fluid flow, thereby allowing fluid flow between the manifold and the hydraulic propeller motor;

a wheel motor valve fluidly connected between the second port defined in the manifold and the plurality of wheel motors; and a wheel motor bypass valve fluidly connected between the third port defined in the manifold and the hydrostatic pump and mechanically connected to said wheel motor valve whereby when said wheel motor valve is open to fluid flow between the manifold and the plurality of wheel motors said wheel motor bypass valve is closed to fluid flow between the manifold and the hydrostatic pump and when said wheel motor valve is closed to fluid flow between the manifold and the plurality of wheel motors said wheel motor bypass valve is open to fluid flow between the manifold and the hydrostatic pump.

11. The vehicle of claim 10 wherein the three-way valves on the left and right hydraulic manifold assemblies are mechanically connected to each other, the propeller motor isolation valves on the left and right hydraulic manifold assemblies are mechanically connected to each other, the wheel motor valves on the left and right hydraulic manifold assemblies are mechanically connected to each other, and the wheel motor bypass valves on the left and right hydraulic manifold assemblies are mechanically connected to each other such that the corresponding valves in the first hydraulic manifold assembly and the second hydraulic manifold assembly permit fluid flow along identical paths.

12. The vehicle of claim 11 further comprising
a mechanical connection between the first propulsion selection lever and the left and right hydraulic manifold assemblies whereby the fluid flow through three-way valves and the propeller isolation valves can be controlled and
a mechanical connection between the second propulsion selection lever and the left and right hydraulic manifold assemblies whereby the fluid flow through wheel motor valves and the wheel motor bypass valves can be controlled.

13. The vehicle of claim 12 wherein the mechanical connection between the first propulsion selection lever and the left and right hydraulic manifold assemblies is a push-pull cable and the mechanical connection between the second propulsion selection lever and the left and right hydraulic manifold assemblies is a push-pull cable.

* * * * *